INVENTOR
LAWRENCE R. BOSCH,
BY Hall & Houghton
ATTORNEY

INVENTOR
LAWRENCE R. BOSCH,

BY Hall + Houghton
ATTORNEY

Feb. 26, 1957 L. R. BOSCH 2,783,045

PUSH AND PULL EXERCISER

Filed April 12, 1954 4 Sheets-Sheet 3

INVENTOR
LAWRENCE R. BOSCH,

BY Hall & Houghton

ATTORNEY

Feb. 26, 1957 L. R. BOSCH 2,783,045

PUSH AND PULL EXERCISER

Filed April 12, 1954 4 Sheets-Sheet 4

INVENTOR
LAWRENCE R. BOSCH,

BY *Hall & Houghton*

ATTORNEY

United States Patent Office 2,783,045

Patented Feb. 26, 1957

2,783,045

PUSH AND PULL EXERCISER

Lawrence R. Bosch, Devils Lake, N. Dak.

Application April 12, 1954, Serial No. 422,576

11 Claims. (Cl. 272—81)

This invention relates to a conditioning machine for building and developing the human body, and more particularly to a device for providing physical exercise.

Exercising devices or so-called body builders of the prior art assume many forms. For the most part such devices are based upon the principle of physical resistance to the motion of the various body muscles. This resistance is applied through the use of weights, springs or the like or through the use of the weight or inertia of the human body itself. In the past a great number of separate devices have been required, for to obtain the most beneficial results it has been necessary to employ a specialized exercising device adapted for the use of a particular muscle or muscle group. In order to obtain such exercising equipment it has, therefore, been necessary to expend large sums of money on equipment which, when accumulated, occupies a great deal of space and usually requires a special room for its use and storage. The prior art equipment is not only expensive and wasteful of space but is complicated to operate, cumbersome, uncomfortable to employ, difficult to adjust to various muscle powers, and in many instances is actually unsafe.

The present invention overcomes these and other deficiencies of the prior art. It provides an exercising device which is compact, economical, versatile, simple, and which is comfortable, fun and safe to use. The exercising device of the present invention may be quickly adapted to the use of relatively strong or weak persons and to the exercising of relatively strong or weak muscle groups. Special balancing ability is not required of the user in order to perform the various exercises afforded by the new equipment, and the exercising of a particular muscle does not tire other portions of the body as is quite prevalent with the prior art devices. Moreover, the present invention employs an entirely new principle of operation, that is, the use of an easily variable gravitational force. In addition, the invention employs a uniquely integrated assembly of parts which may be employed in many combinations to perform almost innumerable exercising functions.

Accordingly it is a primary object of the invention to provide a unique exercising device, conditioning machine or body builder.

A further object of the invention is to provide a device of the character described which while simple and compact allows the performance of almost innumerable exercises.

An additional object of the invention is to provide in a single unit an exercising device which is capable of use in performing exercising functions heretofore only performable with the aid of a great many individual and specialized devices.

Yet another object of the invention is to provide a body building machine which employs the principle of variable gravitational pull.

A still further object of the invention is to provide a conditioning machine which not only serves as a variable resistance to muscle movement but which also serves as a stand for physical exercises and for other purposes requiring only the human body itself.

These and other objects of the invention will become more apparent in the following detailed description of the invention when considered in conjunction with the accompanying drawings wherein.

Briefly, the invention provides an exercising assembly capable of use in a plurality of combinations which may include some or all of the following parts: a fixed ladder, an adjustable track, an adjustable carriage, a pair of footrests, a pair of straps or chains and associated handles and chinning bar, barbells or other weights, and a plurality of connecting elements. In general, the ladder is fixed rigidly to a vertical wall with its rungs horizontal. The adjustable track is assembled with one end on a rung of the ladder and the other end on a floor surface, the track being placed on any one of the many ladder rungs. The carriage is placed on the track so it may be reciprocated thereon to a predetermined extent. A removable footrest and the barbells or weights may be mounted on the carriage. The straps and associated handles may be suspended from various positions on the vertical ladder, and the chinning bar may be connected to the ends of the respective straps. The second footrest may be assembled at the lower end of the track, and both this footrest and the carriage itself may serve as supporting means to elevate the associated end of the track.

In Figures 1 to 11 the elements of the invention have been illustrated separately and in combination. The particular combinations shown are for explanatory purposes and should not be construed as restricting the invention, as will appear more fully hereinafter.

Figures 1, 2, 3:
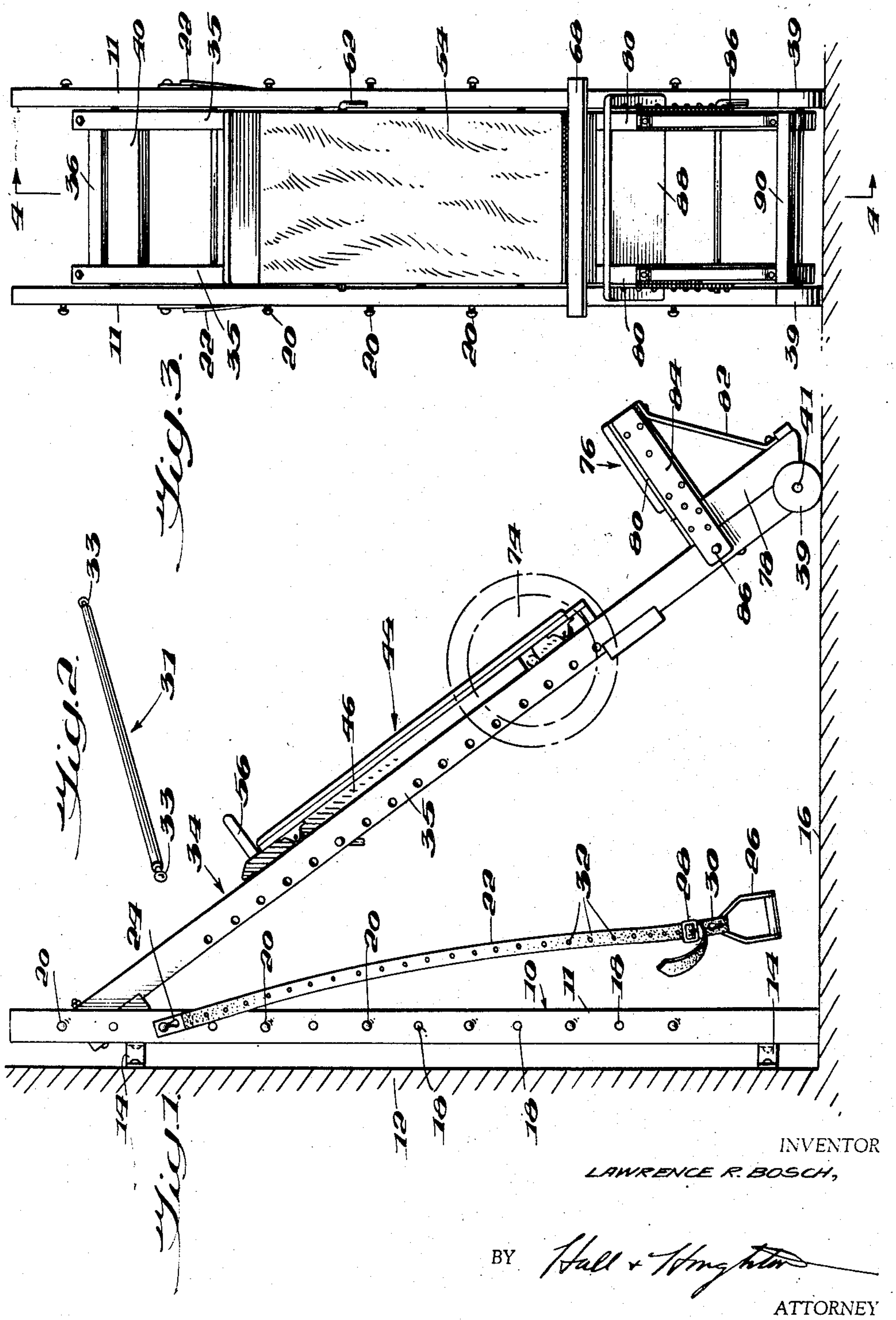
Figure 1 is a side elevation view of a basic combination of components comprising the exercising device.
Figure 2 is a perspective view of a chinning bar which may be employed in combination with other elements of the device.
Figure 3 is a front elevation view of the assembly of Figure 1.
Figures 4, 5:
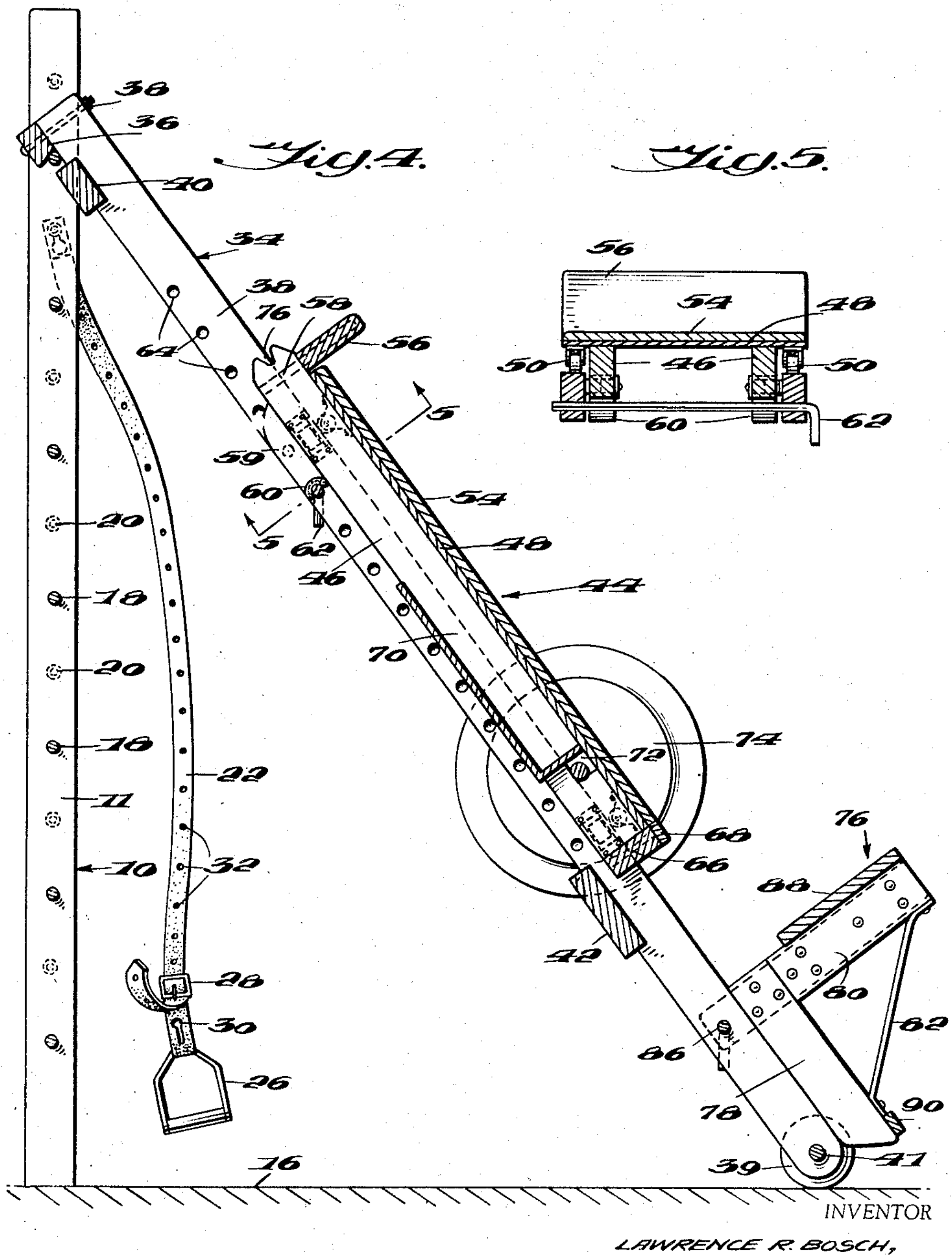
Figure 4 is a sectional elevation view taken along line 4—4 in Figure 3 in the direction of the arrows.
Figure 5 is a sectional detail taken along line 5—5 in the direction of the arrows in Figure 4.

Referring to Figures 1, 3 and 4, a ladder generally designated by reference numeral 10 is shown resting on a floor surface 16 and rigidly fixed to a vertical wall surface 12 by a pair of brackets 14, which may comprise rigid metal bent to an S or U shape. The ladder comprises a pair of vertical elements 11 which support a plurality of spaced horizontal rungs 18. It will be evident that the ladder and the other inflexible parts to be described below may be composed of any suitable material, such as hard wood or metal. A plurality of bolts or heavy screws 20 (which may be numbered for easy reference) are located at different vertical positions along the outer surfaces of the elements 11 and a pair of straps 22, which may be composed of heavy leather, for example, are removably suspended from the bolts by metal end pieces 24 rigidly secured to the straps and having key-hole shaped slots therein as illustrated. Each strap is provided with a handle 26 connected to a buckle 28 which is provided with a tongue for engagement with a plurality of holes 32 along the straps. It is evident that the straps may be supported at any one of the plurality of positions along the ladder and that the handles may be supported at any one of the plurality of positions along the straps. The handles are provided with metal bolt heads 33 of a chinning bar generally designated by reference numeral 31 in Figure 2. The bolts or screws 20 and metal end pieces 24 constitute means for adjustably attaching the straps to the ladder, and such means may take any suitable form, e. g. the ladder rungs may extend through the ladder rails and be provided with crutch tips or the like in spaced relation thereto, to serve the purpose of the bolts 20, and the pieces 24 may take the form of hooks or straps loops engageable over the protruding ends of the rungs, in which event the rungs may be more closely spaced than in the form shown.

An adjustable track 34 comprises a pair of parallel rail elements 35 which may be supported from any one of the ladder rungs by a hooking bar 36 (Figure 4) secured transversely to one end of the rails by bolts 38. The hooking bar may be merely slipped over a ladder rung to secure the track thereto. A pair of lateral braces 40, 42 are provided to unite the rail elements as an integral track structure. The lower end of the track is provided with a pair of wheels 39 supported on a transverse axle 41.

A carriage 44 comprises a pair of longitudinal framing elements 46 (see Figures 6 through 9) and a transverse body supporting surface 48, fixed to the framing elements. Attached to the body supporting surface on one side of each of the longitudinal framing elements is a pair of casters or rollers 50 which engage the upper edge surfaces of the rails of the track 34. The framing members 46 each support an additional pair of casters or rollers 52 which engage respective inner surfaces of the rail elements and prevent the carriage 44 from moving laterally with respect to the track. A cushion, which may be composed of foam rubber, felt or the like, is attached to the body supporting surface 48. A removable footrest 56 provided with dowels or pegs 58, which may be inserted in corresponding bores in the framing members 46, is associated with the carriage. A pair of depending stop members 59 provided with rubber bumpers 60 may be bolted to the lower edge surfaces of the respective longitudinal framing members 46 of the carriage. The bumpers are engageable with a removable stop rod 62 which may be inserted through any one of a plurality of pairs of holes 64 provided in the rail elements 35 of the track for that purpose. Thus, when the stop rod 62 is in position, as illustrated, the carriage 44 will be prevented from downward motion beyond a certain point. Holes 64 may be numbered for easy reference.

The carriage may be provided with an end framing element 66 in order to insure structural rigidity and to serve as a support, as will appear below. A chamber 70 depending from the lower surface of the carriage is provided for storage purposes. When the apparatus is not in use, the many small loose elements, such as the stoprod 62, straps 22, etc., may be stored in the space provided. In Figure 4 barbells 74 have been illustrated as mounted on the carriage with the shaft of the barbells passing through orifices 72 appropriately located in the longitudinal framing elements 46 of the carriage. These weights, which may also be stored in the space 70 when not in use, are employed optionally to increase the resistance of the equipment illustrated to muscle motion. The carriage may also be provided with a transverse bar 68 (see Figures 7 through 9) having end portions which extend beyond the longitudinal framing members of the carriage and serve as hand grip or footrest elements.

Figures 6, 7, 8, 9:
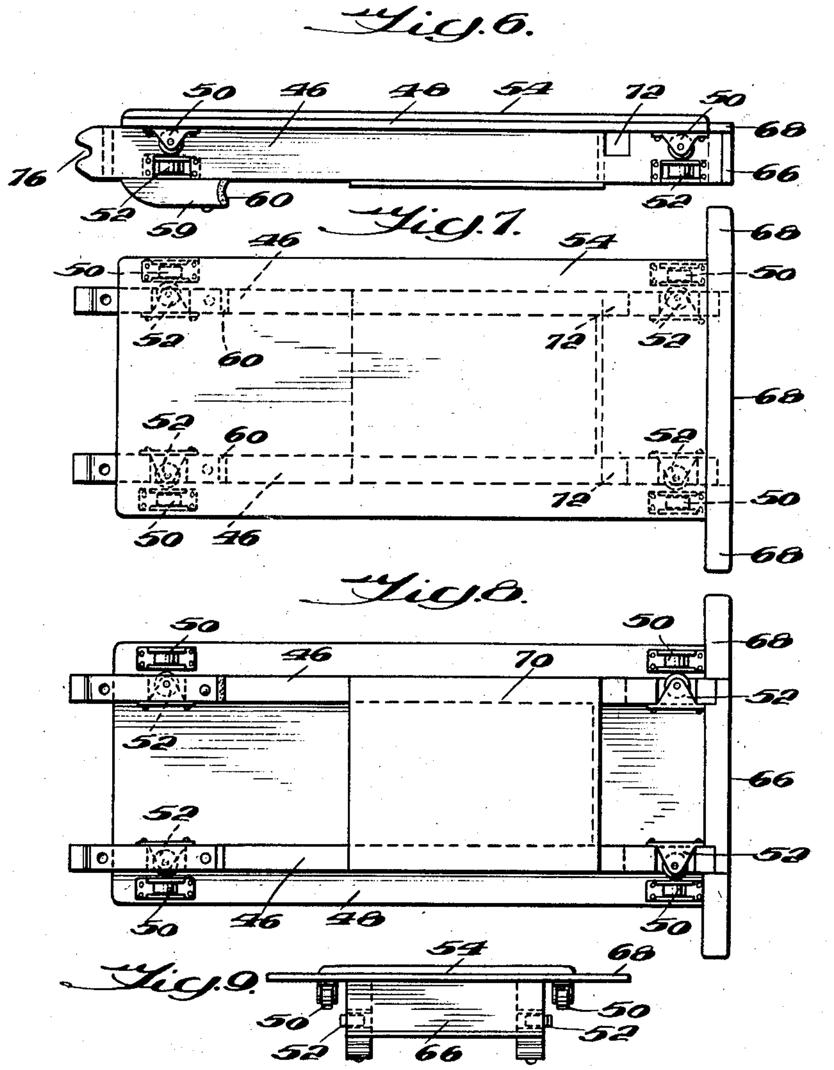
Figure 6 is a side elevation view of a carriage employed in the invention.
Figure 7 is a top plan view of the carriage of Figure 6.
Figure 8 is a bottom plan view of the carriage.
Figure 9 is a front elevation view of the carriage.

One end of each of the respective longitudinal framing elements 46 is provided with a notch 76 as illustrated in Figures 4 and 6. As will appear more fully hereinafter the carriage may be removed from the track and may serve as a support for the wheeled end of the track when the track is employed as a set of high parallel bars or a massage table, for example. In this operation the carriage is arranged vertically with the notches 76 engaging the axle 41 of the wheels 39 or the stop rod 86 and the end framing member 66 engaging the floor surface.

Figures 10, 11:
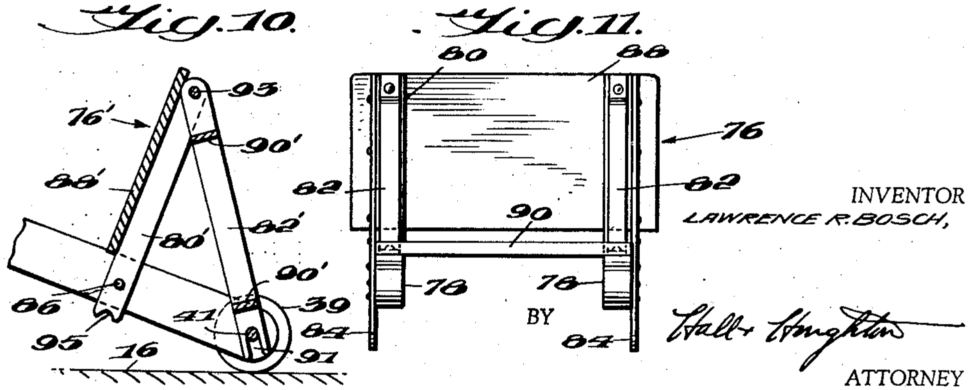
Figure 10 is a side elevation view of one embodiment of a footrest which may be employed in the invention.
Figure 11 is a front elevation view of a modified footrest further illustrated in Figures 2 through 4 in combination with other elements of the invention.

A removable footrest 76 may be mounted at the lower end of the track. In Figures 1, 4 and 11 this footrest has been illustrated as comprising a pair of parallel skeletal elements 78 which may be mounted on the upper edge surfaces of the rails 35 of the track. A pair of orthogonal skeletal elements 80 is rigidly secured to elements 78 by a pair of angle braces 82. Mounting plates 84, which may be bolted to elements 80, have depending portions engageable with the outer side surfaces of rails 35 and suitably provided with a pair of bores to receive a stop rod 86, which passes through these bores and a corresponding pair of bores in the rails 35. The skeletal elements support a footrest plate 88, and are additionally strengthened by a cross brace 90.

Footrest 76 may be employed as a support for the associated end of track 34 when the track is used as a set of low parallel bars or as a massage bench. This is accomplished by merely inverting the footrest so that the elements 78 engage the bottom edge surfaces of rails 35.

Figure 10 illustrates an alternative footrest structure. In this embodiment the orthogonal skeletal elements 80 of Figure 4 are replaced by elements 80′ pivotally attached at 93 to angular elements 82′ which replace the angle braces 82. The lower portions of elements 80′ engage the inner side surfaces of the respective rails 35 of the track, one rail of which has been illustrated in Figure 10, and are provided with bores through which passes the stop rod 86 as in Figure 4. The footrest plate 88′ may be extended so that its lower edge engages the upper edge surfaces of the rails 35 to provide additional rigidity. Angular elements 82′ are notched as indicated at 91 to receive the axle 41 of wheels 39. Lateral cross braces 90′ connect angular elements 82′ and the elements 80′ are provided with shallow notches 95 at their ends while the notches 91 in the elements 82′ are of considerable depth.

The footrest of Figure 10 may also be employed as a support for the wheeled end of the track 34. To render the footrest 76′ a supporting member it is only necessary to remove stop rod 86, collapse elements 80′, 82′ about pivot 93 until they are in the same plane, and pivot the entire footrest assembly about axle 41 until pivot 93 adjoins the floor surface. Elements 80′ and 82′ will then be in a vertical plane, and the footrest will support the rails 35 by the cooperation of the notches 91 and 95 with the axle 41. The roots of the notches 91 and 95 preferably align, as shown, when the elements 80′ and 82′ are folded together, and the axle 41 will therefore maintain them in closed position. The bores for receiving rod 86 are preferably spaced from the notches 95 to enable the surface 88′ to stand at right angles to the rails 35 when the footrest 76′ is mounted thereon.

Referring to Figures 12 through 24, the invention is illustrated in a few of its almost innumerable applications. In order to simplify the explanation the elements of the invention as well as the human body have been illustrated diagrammatically and reference numerals have been used only where essential for clarity. The person utilizing the equipment of the invention has been designated by a stick figure 100.

Figure 12:
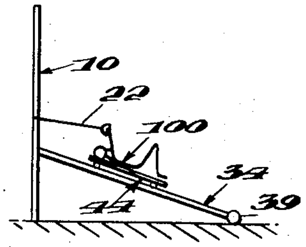
Figures 12 through 24 are illustrative diagrams of the operation of the invention in the performance of a plurality of exercises.

In Figure 12 the track 34 has been illustrated with its ladder engaging end at a relatively low level, that is, engaging a relatively low ladder rung. The carriage is movably mounted on the track 34, but a stop rod may be inserted through the appropriate holes in the rails of the track in order to limit the descent of the carriage. The user 100 is shown lying posteriorly on the surface of the carriage with the knees drawn up and with the hands engaging either the handles or the chinning bar attached to straps 22 which are suspended from the ladder. The position indicated is basic to many exercises, for example, chinning. In this exercise the hands are extended above the head with the arms outstretched and by drawing the hands toward the body and bending the elbows the carriage will be drawn up the inclined track 34 against the gravitational pull on the carriage along the track.

The triceps curl may also be practiced in this position. In this exercise the forearms are curled downwardly causing the carriage to ride up the track against the resistance of the carriage and body weight. Forearm exercise may be practiced by extending the arms above the head and gripping the handles or bar and then flexing the forearms by curling the wrists, thereby causing the carriage to ride up the incline slightly. This exercise is very difficult to do without the use of the conditioning machine illustrated. The chest pull-over exercise may be accomplished by beginning in the position of the forearm exercise and by causing the arms to move in substantially vertical arcs towards the chest, maintaining the arms rigid.

If instead of lying, the user is seated on the carriage facing down the incline, the chest push-out exercise (for exercising the chest, shoulders, upper arms and stomach) may be accomplished by gripping the handles behind the body and pushing downward with the hands causing the carriage to ride up the incline. In this exercise the feet may be placed against the hand grip bar 68 of the carriage (see Figure 3). The push-out exercise would normally be performed with wall pulleys, but the balancing problems which accompany wall pulley operation are eliminated in the conditioning machine of the present invention, and the operator cannot fall as the result of using too much weight. Another chest exercise may be accomplished in this position by gripping the handles with the arms outstretched to the side and bringing the arms together in front of the body in horizontal arcs. The chest and back may also be exercised in the lying position illustrated by gripping the handles with the arms extended to the sides of the body and arcing them downward towards the sides.

It will be noted that in each of the exercises described only the desired muscle or muscle group is exercised and this is accomplished without tiring other muscles or muscle groups. A weak person can easily accomplish these exercises by placing the ladder engaging end of the track 34 on a relatively low rung, while a strong person can make the exercises much more difficult by placing the track on a relatively high rung. Weights may be added to the carriage as indicated in Figure 4 in order to further increase the resistance of the machine. In addition the straps 22 may be suspended from higher or lower positions on the ladder 10 to change the angle of the force exerted.

Figure 13:
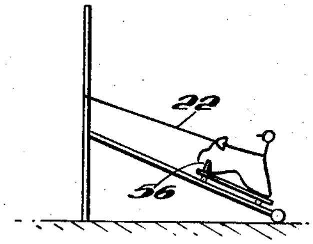

The arrangement of Figure 13 may be employed in the practice of a rowing exercise or the biceps curl. In the former, a conventional rowing motion may be exerted by the user by gripping the handles attached to straps 22. The use of the footrest 56 prevents the user from sliding along the carriage and ensures that the user and the carriage will ride up the inclined track as a unit. In this exercise the riding sensation is quite evident, and due to the use of the casters on the carriage, the exercise is accomplished quite silently. In the biceps curl exercise the handles are grasped with the arms outstretched before the body and the forearms are curled upwardly causing the carriage to ride up the inclined track. This exercise may, of course, be accomplished with the palms of the hands downward or upward as desired.

The position of Figure 13 may also be employed in a chest exercise and a triceps-shoulder exercise. In the former the arms are swung inwardly against the chest with the elbows bent. In the latter the arms are pivoted rigidly about the shoulders, from the front to the back of the body.

Figure 14:
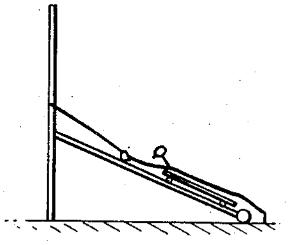

In Figure 14 another chinning exercise may be accomplished with the user lying anteriorly on the carriage and grasping the chinning bar suspended from the straps 22, with the arms outstretched as indicated. By pulling downward the carriage is caused to rise up the inclined track. In this exercise the upper arms, shoulders, back and chest are conditioned.

Figure 15:
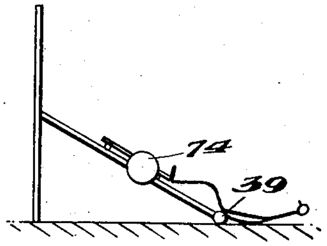

In Figure 15 the machine is employed in the performance of a leg press. Here the user lies on his back on the floor with the feet against hand grip bar 68 (see Figure 3) or end wall 66 of the carriage. The hands may grasp the axle of the wheels 39 in order to eliminate slippage of the body across the floor. The carriage is forced upward along the inclined track by the power of the legs alone, and weights 74 may be added to make the exercise more difficult. Here, as in the other instances of the use of the inclined track, the angle of incline may be changed to decrease or increase the component of gravitational force applied against the user's muscles.

Figure 16:
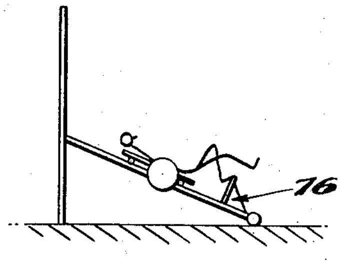

The position illustrated in Figure 16 may be employed in the deep knee bend either with both legs or one leg. In this instance the footrest 76 (or 76′) is attached to the bottom of the inclined track, and the pressure exerted thereon by the legs of the user is relied upon to move the carriage up the track. The one leg deep-knee bend is particularly effective on this machine, since the need for balance is completely eliminated. This position may also be utilized in the toe raising exercise, which is usually complicated by the need for balance. Here again one leg or both may be worked.

Figure 17:
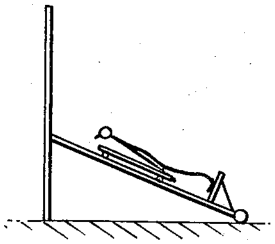

The toe raising exercise may also be done as illustrated in Figure 17 with the user lying face downward on the carriage. In this position the hands, if desired, may grasp the hand grip bar 68 of the carriage.

Figure 18:
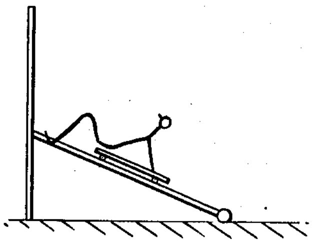

Figure 18 illustrates the position for practicing the exercise of the biceps femoris. This muscle, located on the rear of the upper legs, is usually very difficult to exercise, since some type of weight must be fastened to the foot. In conventional practice while the person balances on one leg, the weighted one is curled up and down. On the conditioning machine of the invention this exercise becomes quite simple, since one merely places a stop rod through the last upper hole on the track, sits on the carriage, hooks his heels over the stop rod and proceeds to perform the very same curling movement described above. A towel may be wrapped around the stop rod to serve as padding, if desired.

Figure 19:
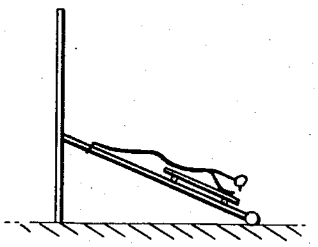

Figure 19 illustrates the position for exercising the shin muscle, which is rarely exercised in conventional practice because the toes have to lift the weight, producing many problems. In this exercise the instep may be placed against a stop bar as indicated with respect to Figure 18, and the flexing of the ankles will cause the carriage to ride up and down the inclined track.

Figure 20:
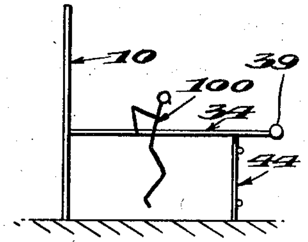

Figure 20 illustrates a divergence from the foregoing illustrations, because in this instance the carriage is employed to support the wheeled end of the track 34 so that the track assumes the position of parallel bars. The notches 76 on the longitudinal framing members of the carriage, as illustrated in Figure 4, may engage either a stop bar which has been inserted through the appropriate holes in the track or the axle for the wheels 39. In this arrangement the carriage 44 merely serves as a vertical support for the track. In Figure 20 the user is illustrated as performing a dipping exercise, which can be accomplished quite simply as shown.

Figure 21:
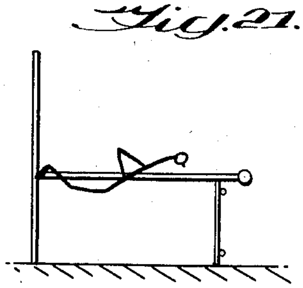

Figure 21 illustrates the same arrangement as Figure 20 employed in the performance of push-ups. Here the hands grasp the parallel rails of the track, and the feet may be braced against the brace 40 or hooking bar 36 as illustrated in Figure 4, or against a stop bar inserted in appropriate holes.

Figure 22:
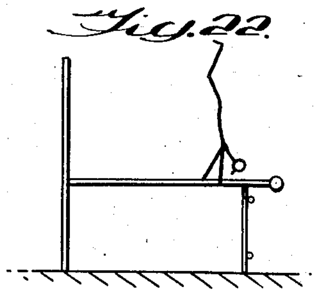

The hand stand exercise may be easily accomplished as illustrated in Figure 22. The lateral brace 42 for the parallel rails 35, as illustrated in Figure 4, may serve as a landing place.

If instead of using the carriage 44 as a support for the track, the footrest 76 or 76' is employed, the track may be utilized as a low set of parallel bars, which may be deemed safer by inexperienced users. In this arrangement the footrest 76 illustrated in Figure 4 may be employed as a support by merely reversing its position so that the skeletal members 78 engage the lower edges of the rails 35 instead of the upper edges as illustrated. The footrest will then extend downward from the track. Footrest 76' may be similarly employed as indicated previously. Of course, in the low parallel bar arrangement the ladder engaging end of the track is lowered to a rung commensurate with the height of the supporting members.

Figure 23:
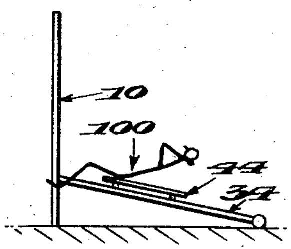

Figure 23 illustrates the use of the apparatus in an abdominal raise or sit-up exercise. Here the track has been placed on a lower level of the ladder and the movable carriage has been again located for reciprocation on the track. The user lies on the carriage facing upward with the heels braced against hooking bar 36 or a padded stop rod appropriately placed. The arms may be clasped behind the neck or behind the head. This exercise is performed in the conventional manner by merely sitting up, but the strenuousness of the exercise is dependent upon the angle of the track. It should be particularly noted that the use of the arrangement shown ensures a friction-free exercise. In conventional practice sit-ups are accomplished on the floor, and considerable rubbing of the sacroiliac or hips results. This is usually evidenced by the tendency of the user's gym trunks to creep downward. With the apparatus illustrated, however, the soft rubber cushion on the carriage provides a comfortable seating several inches above the floor and easily accessible. As the body is raised or lowered, the friction mentioned above is absorbed by movement of the carriage, which may actually move from three to five inches.

Figure 24:
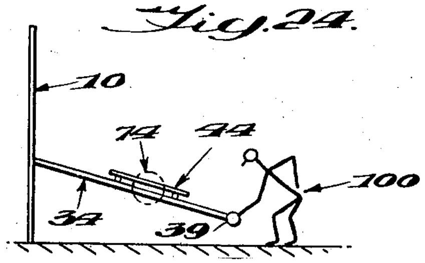

The arrangement illustrated in Figure 24 may be employed in either the dead weight lift or the side exercise. In this instance the weight of the track and carriage, or if desired, of the added barbells, serves as resistance to the muscular action. In the dead weight lift the user may lean forward and grasp the axle of the wheels 39 with both hands and then lift upward on the track, causing the latter to pivot about the supporting rung of ladder 10. In the side exercise the user may stand with either side toward the axle, grasp the axle with one hand and lift. The use of the arrangement shown eliminates any need for balancing. Moreover if the user should accidentally drop the carriage, it would swing in an arc away from the feet and legs.

It will be clear that the inclined track and carriage as illustrated in Figure 12, for example, may serve as an inclined bench to aid in the performance of arm presses at different angles. The position of the exercised muscles can be changed by merely changing the angle of the track. In the low parallel bar arrangement, with the foot rest employed as a support, the apparatus may serve as a convenient massage table by merely placing the carriage on the track. Moreover, the ladder itself may be employed in the performance of various exercises such as the flag stand, for example. While a plurality of exercising arrangements have been illustrated, it will be evident to those skilled in the art that innumerable additional exercising arrangements are inherent in the apparatus of the invention. This apparatus will perform at least the following functions:

High parallel bars
Low parallel bars
Rowing machine
Wall pulleys
Deep knee bend machine and stand
Leg press machine
Iron leg boots
Barbells
Abdominal board
Gable stretchers
Stall bars
Chest crushers
Massage bench
Incline bench
Grippers
Dead lift belts
Chinning bar
Calf-flex machine
Ankle exerciser
Hand, wrist and forearm tables
Triplex chest weights
Sit-up machine
Dumbbells
And many others Accordingly the embodiments and illustrations given should not be taken as restrictive but merely as exemplary of the concepts of the invention. The scope of the invention may be obtained from the following claims.

I claim:

1. In combination, a vertical support having a plurality of track supporting elements arranged at different levels above a floor surface, a track having one extremity pivotally engageable with but readily removable from said elements selectively and the opposite extremity entirely free from said support and having carriage supporting elements, means for selectively coupling said one extremity of said track to said track supporting elements, means for supporting said opposite extremity of said track on said floor surface, a carriage, and means for movably supporting said carriage on said carriage supporting elements, said support having means for mounting said support vertically independently of said track, said carriage having removable weights for selectively varying the weight thereof.

2. A body conditioning device comprising a support adapted to be mounted substantially upright above a floor surface, an elongated track, means on said support for detachably mounting one end of said track above said floor surface at any one of a plurality of levels selectively, whereby said track may be inclined with respect to said surface, at least one elongated tensile element, means on said support for fixing a point near one end of said element selectively at any one of a plurality of levels above said surface, a carriage, and means for supporting said carriage for reciprocation along said track, whereby a force applied to said tensile element by a body on said carriage will tend to cause said carriage to move along said track against the force of gravity on said carriage, the direction of said force being variable in accordance with the location of the point at which said tensile element is fixed.

3. The assembly of claim 2, said track having support engaging means at its other end, said carriage having means for engaging said last-mentioned support engaging means, whereby said carriage may be arranged vertically to serve as a support for said other end, the length of said carriage being correlated with the mounting means for said one end of the track so that the track may be supported substantially horizontally on said carriage and said mounting means.

4. The assembly of claim 2, said track having support engaging means at its other end, a removable footrest on said track at its other end, said footrest having means for engaging said last-mentioned support engaging means, whereby said footrest may serve as a support for said other end, the height of said footrest being correlated with the mounting means for said one end of the track so that the track may be supported substantially horizontally on said footrest and said mounting means.

5. The assembly of claim 2, said carriage having a length at least as great as the torso of the average human body.

6. A device in accordance with claim 2, including two of said tensile elements and means for fixing said elements on said support individually.

7. The assembly of claim 6, said tensile elements including a pair of handles adjustable therealong and a removable chinning bar.

8. A device, in accordance with claim 2, said support being a ladder, said means for mounting said one end of said track on said support including the rungs of said ladder, and means at the last-mentioned track end for embracing said rungs.

9. A device in accordance with claim 2, said track having means for limiting the descent of said carriage therealong to any one of a plurality of levels selectively.

10. A device in accordance with claim 2, the other end of said track being entirely free and said one end of said track being pivotable on its support, whereby the free end may be lifted off of said surface.

11. A device in accordance with claim 2, said carriage having removable weights for selectively varying the weight thereof.

References Cited in the file of this patent

UNITED STATES PATENTS

| | | |
|---|---|---|
| 339,638 | Goldie | Apr. 13, 1886 |
| 682,988 | Hazelip | Sept. 17, 1901 |
| 1,982,872 | Husted | Dec. 4, 1934 |
| 1,996,350 | Schaff | Apr. 2, 1935 |
| 2,456,412 | Heimbaugh | Dec. 14, 1948 |

FOREIGN PATENTS

| | | |
|---|---|---|
| 850,610 | France | 1939 |